Feb. 20, 1951     W. M. HORTON     2,542,141
OIL SEAL
Filed June 12, 1948
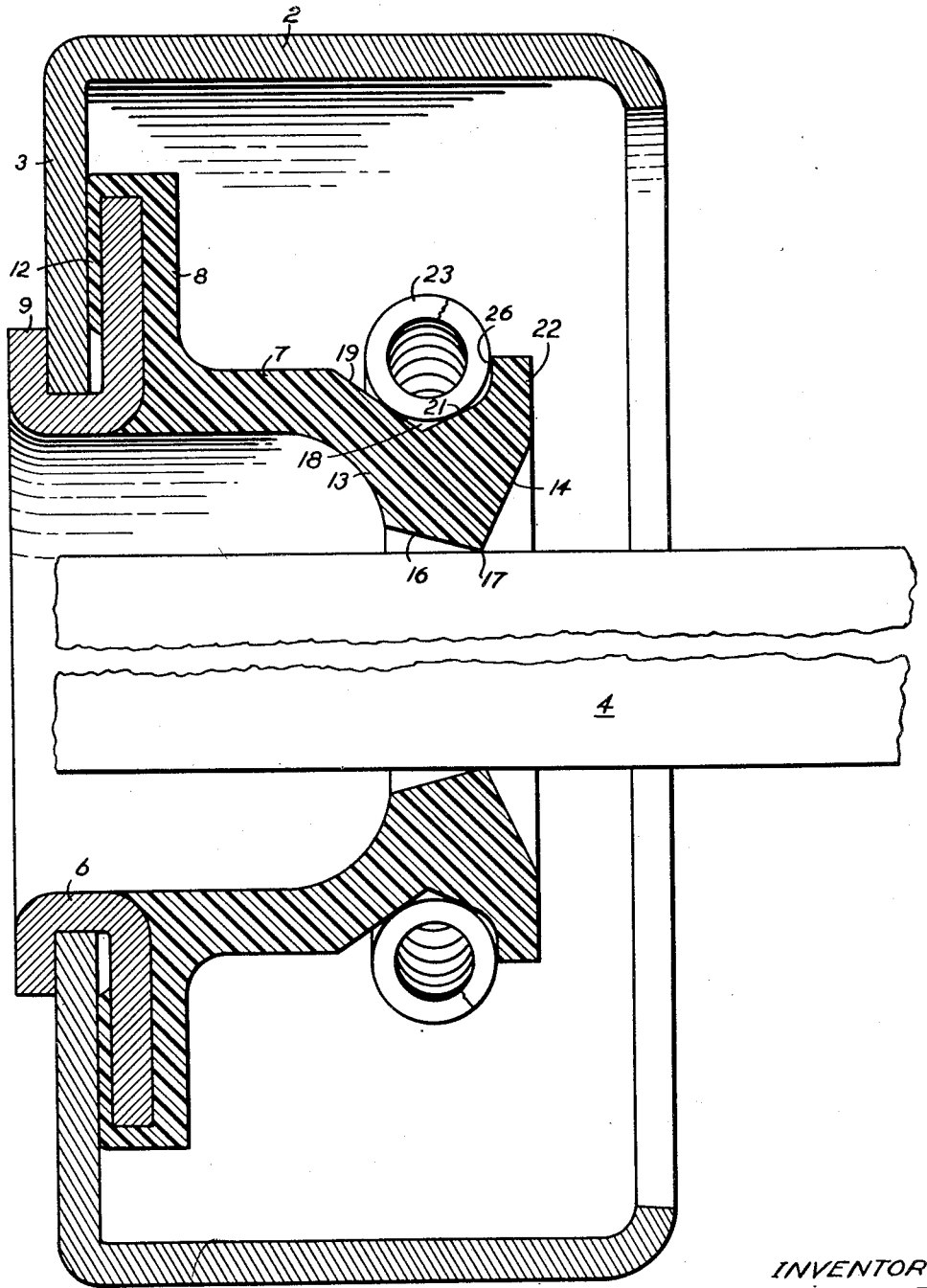
INVENTOR
WILLIAM M. HORTON
BY Charles S. Evans
his ATTORNEY Patented Feb. 20, 1951

2,542,141

UNITED STATES PATENT OFFICE 2,542,141

OIL SEAL

William Miller Horton, Palo Alto, Calif.

Application June 12, 1948, Serial No. 32,644

2 Claims. (Cl. 286—5)

My invention relates to oil seals and particularly to oil seals for preventing leakage around a shaft extending from a housing.

It is among the objects of my invention to provide an efficient and durable oil seal.

Another object of my invention is the provision of a permanent oil seal wherein arrangement is made to prevent accidental dislodgement of the constricting spring.

My invention possesses other objects and features of advantage, some of which, with the foregoing, will be set forth in the following description. It is to be understood, however, that I do not limit myself to the showing made by the said description and drawing, as I may adopt variant forms of the invention within the scope of the appended claims.

The single figure of the drawing is an elevation in axial section of an oil seal embodying my invention.

My oil seal is intended to be used in conjunction with a shaft extending from a housing. Broadly, it includes a deformable ring having an annular edge formed on its inner surface for complete circumferential engagement with the shaft. Spring means are provided on the ring for constricting it around the shaft to ensure a leakproof engagement; and the ring is formed so as to prevent accidental disengagement of the spring means. A casing surrounding the shaft is provided for mounting the ring in the housing; and the ring is sealed to the casing in such a way that the body of the ring is included between the seal and the annular edge to afford greater adaptation to automatic variations in concentricity.

In greater detail and with reference to the drawing, my oil seal comprises a cylindrical casing 2 having an inwardly extending flange 3 on one end. The other end of the casing is preferably turned in slightly as shown, to maintain its structural stability.

Preferably, the casing 2 is formed with a slight taper, so that it may be more easily pressed into the housing in which the seal is to be used.

Leak-proof means are interposed between the casing and the shaft 4. A retaining collar 6 is bonded to a deformable ring 7, which is preferably made of neoprene, by fixing it under heat and pressure within a circumferential flange 8 of U-shaped cross-section on one end of the ring. In this way, an impermeable permanent seal exists between the collar 6 and the ring surfaces in contact therewith.

The portion of the retaining collar 6 which extends from the ring flange is then spun over the inside rim of the casing flange 3 to form an outer flange 9, as shown. The free end 12 of the ring flange 8 is thus tightly clamped between the retaining collar 6 and the casing flange 3, to form a secure impassable circumferential seal between the deformable ring and the casing.

Sealing means between the deformable ring and the shaft are provided. An inwardly-extending annular thickened body or lip 13 is formed on the ring on the end opposite the retaining collar 6. Conical surfaces 14 and 16 on the lip intersect to define an annular edge 17, which circumferentially engages the shaft 4. In this way, the bearing surface between the deformable ring and the shaft is at a minimum, while a sturdy seal body is afforded.

With this arrangement, the spacing on the ring 7 between the annular lip 13 and the flange 8 permits a certain amount of flexibility in their relationship, without affecting the efficiency of either seal. As a consequence, small inevitable deviations in the concentricity of the casing 2, the retaining collar 6 and the neoprene ring 7 will be compensated by the cantilever action between the end of the ring 7 sealed to the casing and the free end carrying the lip 13.

Spring means are provided to constrict the ring about the shaft. A circumferential groove 18 on the outer surface of the deformable ring 7 opposite the lip 13 is formed by the intersection of a conical surface 19 and the conical face 21 of a peripheral wall 22 on the free end of the ring. A coil spring 23 is carried in the groove; and with this arrangement a constant pressure is applied to maintain the engagement between the edge 17 and the shaft 4.

The shape of the groove is such that accidental dislocation of the coil spring is prevented. A portion 26 of the wall 22 contiguous to the spring 23 lies in a plane perpendicular to the axis of the shaft 4. Moreover, the wall extends radially as far as the center of the spring. The spring is thus supported by the two conical surfaces 19 and 21 and by the wall 22. The combination of the groove and the peripheral wall ensures positive engagement of the spring and minimizes the chances of its accidental dislodgement.

I claim:

1. An oil seal for preventing leakage around a shaft extending from a housing, comprising an inwardly flanged casing surrounding the shaft for mounting in the housing, a deformable ring having on its inner face at one end an annular edge for complete circumferential engagement with the shaft and on its outer face at the other end an inwardly opening U-shaped flange lying against the inside of the casing flange, and an outwardly opening U-shaped collar binding the ring to the casing flange with one leg of the collar within the ring flange and the other leg against the outside of the casing flange.

2. An oil seal for preventing leakage around a shaft extending from a housing, comprising a casing surrounding the shaft for mounting in the housing, a radial flange extending inwardly from the casing, a deformable ring having on its inner face at one end an annular edge for complete circumferential engagement with the shaft and on its outer face at the other end an inwardly opening U-shaped flange lying against the inside of the casing flange, an outwardly opening U-shaped collar binding the ring to the casing flange with one leg of the collar bonded within the ring flange and the other leg on the outside of the casing flange, and spring means for constricting the annular edge.

WILLIAM MILLER HORTON.

REFERENCES CITED

The following references are of record in the file of this patent:

UNITED STATES PATENTS

| Number | Name | Date |
|---|---|---|
| 2,052,762 | Gits | Sept. 1, 1936 |
| 2,213,116 | Bernstein | Aug. 27, 1940 |
| 2,316,713 | Procter | Apr. 13, 1943 |
| 2,405,279 | Victor | Aug. 6, 1946 |
| 2,483,988 | Victor | Oct. 4, 1949 |

FOREIGN PATENTS

| Number | Country | Date |
|---|---|---|
| 585,488 | Great Britain | of 1947 |
| 590,128 | Great Britain | of 1947 |